United States Patent
Wilensky

(10) Patent No.: US 11,295,494 B2
(45) Date of Patent: Apr. 5, 2022

(54) IMAGE MODIFICATION STYLES LEARNED FROM A LIMITED SET OF MODIFIED IMAGES

(71) Applicant: Adobe Inc., San Jose, CA (US)

(72) Inventor: Gregg Darryl Wilensky, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/453,398

(22) Filed: Jun. 26, 2019

(65) Prior Publication Data

US 2020/0410730 A1 Dec. 31, 2020

(51) Int. Cl.
*G06T 11/60* (2006.01)
*G06T 7/00* (2017.01)
*G06F 17/18* (2006.01)
*G06K 9/62* (2006.01)

(52) U.S. Cl.
CPC .............. *G06T 11/60* (2013.01); *G06F 17/18* (2013.01); *G06K 9/6215* (2013.01); *G06T 7/0002* (2013.01); *G06T 7/97* (2017.01)

(58) Field of Classification Search
CPC combination set(s) only.
See application file for complete search history.

(56) References Cited

U.S. PATENT DOCUMENTS

| | | | |
|---|---|---|---|
| 8,214,766 B1 | 7/2012 | Berger et al. | |
| 9,396,558 B2 * | 7/2016 | Wakazono | G06T 11/00 |
| 9,491,263 B2 * | 11/2016 | Gadot | H04L 67/42 |
| 9,558,428 B1 | 1/2017 | Green | |
| 10,049,477 B1 * | 8/2018 | Kokemohr | G06T 11/60 |
| 10,198,871 B1 * | 2/2019 | Hariton | G06T 19/006 |
| 10,325,382 B2 * | 6/2019 | Taite | G06T 11/001 |
| 10,664,963 B1 * | 5/2020 | Rossi | G06K 9/46 |
| 10,872,399 B2 * | 12/2020 | Li | G06N 3/088 |
| 2002/0015514 A1 * | 2/2002 | Kinjo | G06K 9/00221 382/118 |

(Continued)

OTHER PUBLICATIONS

"Combined Search and Examination Report", GB Application No. 2006038.0, dated Jan. 8, 2021, 86 pages.

(Continued)

*Primary Examiner* — Motilewa Good-Johnson
(74) *Attorney, Agent, or Firm* — FIG. 1 Patents

(57) ABSTRACT

Image modification styles learned from a limited set of modified images are described. A learned style system receives a selection of one or more modified images serving as a basis for a modification style. For each modified image, this system creates a modification memory, which includes a representation of the image content and modification parameters describing modification of this content to produce the modified image. These modification memories are packaged into style data, used to apply the modification style to input images. When applying a style, the system generates an image representation of an input image and determines measures of similarity between the input image's representation and representations of each modification memory in the style data. The system determines parameters for applying the modification style based, in part, on these similarity measures. The system modifies the input image according to the determined parameters to produce a styled image.

20 Claims, 9 Drawing Sheets

(56) References Cited

U.S. PATENT DOCUMENTS

| | | | |
|---|---|---|---|
| 2014/0241592 A1* | 8/2014 | Yang | G06T 5/001 |
| | | | 382/118 |
| 2014/0258101 A1* | 9/2014 | Svendsen | G06Q 50/184 |
| | | | 705/39 |
| 2015/0098646 A1 | 4/2015 | Paris et al. | |
| 2015/0363380 A1* | 12/2015 | McNaught | G06F 40/186 |
| | | | 715/235 |
| 2017/0139572 A1* | 5/2017 | Sunkavalli | G06F 3/04845 |
| 2018/0040110 A1* | 2/2018 | Deluca | G06T 5/005 |
| 2019/0095436 A1* | 3/2019 | Martinazzi | G06T 11/60 |
| 2019/0236371 A1* | 8/2019 | Boonmee | G06K 9/00765 |

OTHER PUBLICATIONS

Lee, Joon-Young et al., "Automatic Content-Aware Color and Tone Stylization", arXiv Preprint, arXiv.org [retrieved Feb. 2, 2021], Retrieved from <https://arxiv.org/pdf/1511.03748.pdf>., Nov. 12, 2015, 12 pages.

Luan, Fujun et al., "Deep Photo Style Transfer", arXiv Preprint, arXiv.org [retrieved Feb. 2, 2021], Retrieved from the Internet <https://arxiv.org/pdf/1703.07511.pdf>., Apr. 11, 2017, 9 pages.

* cited by examiner

IMAGE MODIFICATION STYLES LEARNED FROM A LIMITED SET OF MODIFIED IMAGES

BACKGROUND

Content editing systems include a variety of tools that enable modification of vast amounts of digital visual content, such as digital images—an example of which is digital photographs. Users are able to interact with these content editing systems in various ways (e.g., touch functionality, styluses, keyboard and mouse, and so on) to modify digital images. For instance, many such systems support operations to modify visual characteristics of the digital images. These systems often parameterize different visual characteristics and expose components with which a user can interact to adjust values of the parameters. Examples of such parameters include exposure, contrast, highlights, shadows, whites, blacks, vibrance, contrast, clarity, brightness, saturation, and so forth. Responsive to adjustment of a parameter (e.g., via a slider), content editing systems modify the corresponding visual characteristic of the digital image. Oftentimes users adjust parameters so that their digital images (or collections of their digital images) have a consistent "look and feel"—so that they have a particular "style."

Conventional systems include functionality to propagate styles from these styled digital images to digital images that are not yet styled. For example, some of these conventional systems propagate styles by simply copying the parameter values of the styled digital images and then setting the parameter values of the not-yet-styled images equal to the copied parameter values. However, these systems fail to account for how styles are applied to different scenes depicted in different images, such as how styles may be applied to an image depicting a sky versus an image depicting an indoor scene. This can cause the resulting images generated by simply applying the same set of extracted parameters to appear to have different styles—a non-uniform look. Other conventional systems propagate styles using machine learning such as by using a trained neural network. These neural networks require exposure during training to hundreds, thousands, or even millions of training images to learn visually pleasing characteristics of digital images and to learn a "style" of modification. Accordingly, these conventional systems require a significant amount of time to train a machine learning model and the training can also be a burden on computing resources, making them unsuitable for mobile computing devices.

SUMMARY

To overcome these problems, image modification styles learned from a limited set of modified images are leveraged in a digital medium environment. Initially, a learned style system receives a selection of one or more modified images to serve as a basis for a style of modification, such as based on a user selection of the modified images to create a new style or to supplement an already-created style. For each of the modified images, the learned style system creates a modification memory, which includes a representation of the image content and modification parameters describing how the image's content was modified to produce the modified image. The learned style system generates an image representation by processing the image content and producing reduced information that is representative of the image content rather than a pixel-by-pixel entirety of the image content, e.g., distributions of luminance and chrominance and feature vectors. The learned style system extracts the modification parameters from the modified images and packages these with a generated image representation to form a modification memory. The modification memories for each of the selected images are then packaged into style data (e.g., a text-based file) that can be maintained in storage and subsequently used to apply the modification style to an input image—to modify the input image to have the modification style of the images serving as its basis.

Responsive to selection of an input image and of a modification style to apply to the input image, for instance, the learned style system applies the selected style to the input image. To do so, the learned style system initially generates an image representation of the input image. The learned style system then determines measures of similarity between the input image's representation and the representations of each modification memory captured by the modification style's data. The learned style system determines parameters for applying the modification style to the input image based on the determined measures of similarity and the modification parameters of the modification memories. By modifying the input image according to these determined parameters, the learned style system produces a styled image having the modification style.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
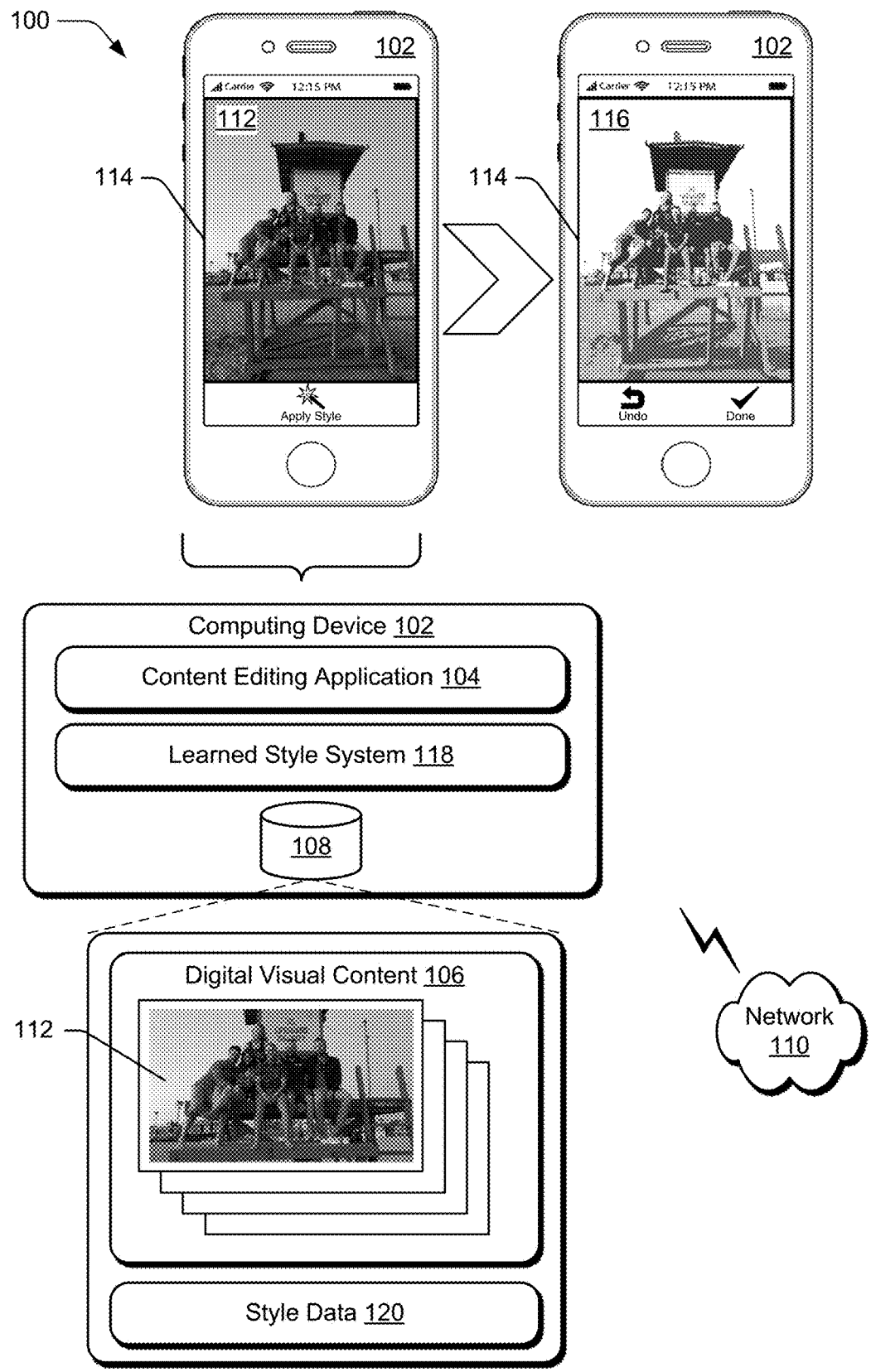
FIG. 1 is an illustration of an environment in an example implementation that is operable to employ techniques described herein.

Conventionally configured content creation systems include limited tools for propagating styles from digital images (or collections of digital images) to digital images that are not yet styled. For example, some of these conventional systems propagate styles by simply copying the parameter values of the styled digital images and then setting the parameter values of the not-yet-styled images equal to the copied parameter values. However, these systems fail to account for how styles are applied to different scenes depicted in different images, such as how styles may be applied to an image depicting a sky versus an image depicting an indoor scene. Other conventional systems propagate styles using machine learning such as by using a trained neural network. These neural networks require exposure during training to hundreds, thousands, or even millions of training images to learn visually pleasing characteristics of the digital images and to learn a "style" of modification. Accordingly, these conventional systems require a significant amount of time to train a machine learning model and the training can be a burden on computing resources, making them unsuitable for mobile computing devices.

To overcome these problems, image modification styles learned from a limited set of modified images are leveraged in a digital medium environment. Initially, a learned style system receives a selection of one or more modified images to serve as a basis for a style of modification. By way of example, the learned style system may receive user selections of the modified images to create a new style or to supplement an already-created style. Alternately or additionally, the learned style system may record modifications as a user makes them to images (e.g., using tools of a content editing application) and use the images modified during this recording as a basis for a style of modification. Regardless, these modified images each include data that corresponds to image content depicting a scene before the modification as well as parameters describing how the content was modified to produce the respective modified image. Example data structures capable of capturing this image content and these parameters include raw images, which include file format types such as .raw, .dng, .crw, .orf, and so on. Example parameters include exposure, contrast, highlights, shadows, whites, blacks, vibrance, contrast, clarity, brightness, saturation, and so forth.

For each of the modified images selected to serve as a basis for a modification style—whether through express user selection, recording a style during a modification session, or otherwise—the learned style system generates a modification memory. These modification memories each include a representation of the respective modified image's content and the modification parameters from the modified image. Broadly speaking, the learned style system generates image representations as reduced information representative of the respective image's content rather than using a pixel-by-pixel entirety of the image content. In one or more implementations, for instance, the learned style system generates two-component image representations. Here, the first component comprises distributions of luminance and chrominance that have been vectorized. The second component comprises a feature vector, having dimensions of numerical features that represent semantic characteristics of a scene depicted in the image content. As discussed further below, these image representations may be configured in other ways in the spirit and scope of the described techniques.

In order to incorporate a modified image's modification parameters in a respective modification memory, the learned style system extracts the modification parameters from the corresponding image file. The learned style system then inserts the extracted parameters into the modified image's modification memory along with the respective image representation. The learned style system generates style data that includes the modification memories generated for each of the modified images serving as a basis for the corresponding style. In one or more implementations, the learned style system generates the style data as a representation of the generated modification memories where the representation is configured for storage in a file structure. For instance, the learned style system may generate the style data in a text-based format, e.g., as readable text such as plain text, a JavaScript Object Notation (JSON) file, and so forth. Alternately or additionally, the learned style system may generate the style data in a binary format. Regardless, the style data can thus be maintained in a file structure at local storage or communicated to various computing devices for remote storage. This enables the style data to be maintained and shared across file systems and users, such as shared by a service to subscribing users or from one user to another. In any case, the style data enables the learned style system to apply the style captured by the modification memories to subsequent images.

The learned style system may apply a selected style to an input image, for instance, responsive to user selections of the style and the input image. To apply a selected style, the learned style system initially generates an image representation of the input image, e.g., in a similar manner as it generates the image representations of the modified images for inclusion as part of the modification memories. The learned style system then determines measures of similarity between the input image's representation and the representations of each modification memory included in the selected style's data. Based on these similarities, the learned style system determines parameters with which to modify the input image so that it has the style of the modified images serving as a basis for the style.

As described below, the learned style system determines these parameters as a weighted combination of the modification parameters captured by the modification style's memories. The learned style system weights the modification parameters such that the modification parameters paired with similar representations contribute more to the combination than the modification parameters paired with less similar representations, if the parameters of the less similar representations contribute to the combination at all. In one or more implementations, the learned style system determines how much the modification parameters of the modification memories contribute to the weighted combination using a shell-based approach. In this approach, the learned style system arranges the modified images in relation to a plurality of shells, e.g., in vector space and using the vectorized modification memories. The learned style system also determines a closeness of the modified images within each of the shells to the input image based on the measures of similarity. Further, the learned style system determines a significance of the modification memories within each of the shells based on averages and standard deviations of respective modification parameters, such as an average of an exposure parameter of the modification memories within a first shell and a standard deviation of the exposure parameter across the modification memories of the first shell.

Once the parameters are determined, the learned style system produces a styled image by modifying the input image according to the determined parameters. Using this approach, the learned style system may capture styles of limited sets of modified images, e.g., just a single modified image, and apply these styles to subsequent images. In other words, this allows learned styles of modification to be based on limited numbers of images. This contrasts with systems that rely on deep learning, statistical machine learning, and the like, which learn styles from training sets of hundreds, thousands, or even millions of professionally-edited training images. These conventional approaches are slow to train a model whereas the training performed by the learned style system is almost immediate—the learned style system's training corresponds to an amount of time the system takes to generate modification memories for any images selected to serve as a basis for the style. By using smaller sets of selected images as a basis for learning a style—such as by learning a style from one or just a few user-selected images—the learned style system is able to learn styles in less time and also without consuming as many computing resources as the systems that rely on deep learning. This reduction in time and lower burden on computing resources is advantageous for use of the described systems with mobile computing devices.

The manner in which the learned style system learns and applies a style also contrasts with techniques that involve mere extraction (e.g., copying) of parameter values. In such conventional approaches, parameters that were modified during image editing are extracted from a modified image. Then, an input image's parameter values are simply modified to match the extracted parameter values. However, these conventional approaches cannot account for differences in different scenes depicted in different images. This can cause the resulting images generated by simply applying the same set of extracted parameters to appear to have different styles—a non-uniform look. In contrast to these conventional approaches, the learned style system learns how to apply a style to images depicting different scenes, e.g., based in part on the feature-vector component of the image representation. In this way, the learned style system is able to modify input images that depict different scenes to nevertheless have a similar style—a uniform look—despite potentially vast differences in original visual characteristics of the input images.

Term Descriptions

As used herein, the term "modification memory" refers to data describing a digital image that has been modified, e.g., using tools of a content editing application. A modification memory captures information about the modified image that can be leveraged alone or in combination with modification memories of other modified images to apply a style of modification to a subsequent image in accordance with the described techniques. As discussed above and below, a modification memory may include an image representation of the respective image and modification parameters describing modifications made to the respective image's depicted content to produce a modified image. Moreover, a modification memory may be configured as a vector, such as a vector that captures a first vector indicative of the image representation and a second vector that captures the modification parameters. These memories contrast with computing memory such as random access memory (RAM), read only memory (ROM), flash memory, and so forth. In this context, a modification memory may be loaded into memory (e.g., RAM) in order to apply a corresponding style to an input image.

As used herein, the term "image representation" refers to reduced information representative of the respective image's content rather than a pixel-by-pixel entirety of the image content. For a modification memory, the image representation corresponds to this reduced information of an unmodified version of the digital content, such as of the image content taken from a raw image format and prior to modifications being made to the image content, e.g., an original image as captured by an image sensing device. Image representations may be configured in a variety of ways, as described below, such as in a two-component configuration.

As used herein, the term "modification parameters" refers to a parameterization of various visual characteristics of digital images where at least one of the visual characteristics has been modified. The term "parameters" alone simply refers to parameterization of the various visual characteristic of digital images. Generally speaking, content editing applications include tools (e.g., exposed user interface components) with which a user can interact to adjust values of the parameters—to modify the parameters. Examples of such parameters include exposure, contrast, highlights, shadows, whites, blacks, vibrance, contrast, clarity, brightness, saturation, and so forth.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 9.

The computing device 102 is illustrated as including content editing application 104. The content editing application 104 represents functionality of the computing device 102 to create and/or edit digital content. By way of example, the content editing application 104 includes functionality to edit digital visual content, such digital graphics, digital images, and digital images that include graphics. Examples of digital graphics include, but are not limited to, vector graphics, raster graphics (e.g., digital photographs), layouts having different types of graphics, and so forth.

Further, the content editing application 104 may enable a client device user to interact with application interfaces presented via the computing device 102 to perform content editing operations, such as selecting portions of digital content, removing selected portions of the digital content, modifying characteristics (e.g., color, blur, saturation, brightness, and so on) of selected portions of the digital content, selecting options to perform automatic modifications of the digital content, and so forth. The content editing application 104 may facilitate other content editing operations without departing from the spirit or scope of the techniques described herein. The content editing application 104 may further be representative of more than one application (e.g., a suite of applications) that supports functionality to perform content editing operations on various types of digital content without departing from the spirit or scope of the techniques described herein.

At least some of the digital content, relative to which the content editing application 104 is configured to perform operations, is represented by digital visual content 106, which is illustrated as maintained in storage 108 of the computing device 102. Although the digital visual content 106 is illustrated as being maintained in the storage 108, the digital visual content 106 may also represent digital visual content accessible to the computing device 102 in other ways, e.g., accessible to the computing device 102 from storage of another device over network 110. In such implementations, the computing device 102 may represent functionality to learn styles of modified images and apply the styles to input images as described above and below for other devices, e.g., to offload some of the computing burden of doing so from those devices. In other words, the computing device 102 may be configured to provide style learning or application of learned styles as a service—and thus be considered associated with a service provider.

The digital visual content 106 may represent various types of digital content without departing from the spirit or scope of the techniques described herein. The digital visual content 106 is depicted with digital photograph 112, for instance, which is also depicted being displayed via display device 114 of the computing device 102 at a first time. The display device 114 is also depicted displaying styled image 116 at a second time, which is after the first time. This represents a scenario in which the digital photograph 112 is modified to produce the styled image 116 by using a style learned from one or more modified images, where the modified images serve as a basis for the style. In this context, consider learned style system 118.

In the illustrated environment 100, the computing device 102 is depicted including the learned style system 118, the functionality of which may be incorporated in and/or accessible to the content editing application 104. The learned style system 118 is implemented at least partially in hardware of the computing device 102 to generate style data 120 from modified images that serve as a basis for styles and to apply styles learned from the modified images to input images. In particular, the learned style system 118 applies learned styles to an input image "automatically," e.g., without receiving user input to specify values of parameters that affect visual characteristics of the input image. Instead, user input is simply received to select an existing style and also to apply the selected style to a digital image. An example of this is to receive user input via a user interface displaying the digital photograph 112, namely, to apply a style to the digital photograph 112 and then to select a style from a displayed list of existing styles. A user of the computing device 102 may provide input to apply existing styles in other ways without departing from the spirit or scope of the described techniques, such as by using keyboard shortcuts, stylus gestures, voice commands, and so forth. Although illustrated as implemented locally at the computing device 102, functionality of the illustrated learned style system 118 may also be implemented in whole or part via functionality available via the network 110, such as part of a web service or "in the cloud."

As discussed in more detail below, the learned style system 118 generates the style data 120 from one or more modified images serving as a basis for the respective style. The learned style system 118 also applies styles, learned from the modified images that are persisted in the style data 120, to input images. With regard to generating the style data 120, the learned style system 118 is capable of generating the style data 120 for styles that are based on only a single modified image. The learned style system 118 is also capable of generating the style data 120 for styles that are based on multiple modified images. Broadly speaking, this allows learned styles of modification to be based on limited numbers of images. This contrasts with techniques that leverage deep learning, statistical machine learning, and the like, which learn styles from training sets of hundreds, thousands, or even millions of professionally-edited training images. These conventional approaches are slow to train a model whereas the training performed by the learned style system 118 is almost immediate—the learned style system 118's training corresponds to an amount of time the system takes to generate modification memories for any images selected to serve as a basis for the style. By using smaller sets of selected images as a basis for learning a style—such as by learning a style from one or just a few user-selected images—the learned style system 118 is able to learn styles in less time and also without consuming as many computing resources as the deep learning techniques. This reduction in time and lower burden on computing resources is advantageous for use of the described techniques with mobile computing devices.

The manner in which the learned style system 118 learns and applies a style also contrasts with techniques that involve mere extraction (e.g., copying) of parameter values. In such approaches, parameters that were modified during image editing are extracted from a modified image. Then, an input image's parameter values are simply modified to match the extracted parameter values. However, these conventional approaches cannot account for differences in different scenes depicted in different images. This can cause the resulting images generated by simply applying the same set of extracted parameters to appear to have different styles—a non-uniform look. In contrast to these conventional approaches, the learned style system 118 learns how to apply a style to images depicting different scenes. In this way, the learned style system 118 is able to modify input images that depict different scenes to nevertheless have a similar style—a uniform look—despite potentially vast differences in original visual characteristics of the input images. The learned style system 118 may thus be considered "image aware" or "content aware."

Having considered an example environment, consider now a discussion of some example details of the techniques for image modification styles learned from a limited set of modified images in a digital medium environment in accordance with one or more implementations.

Image Modification Styles Learned from a Limited Set of Modified Images

Figure 2:
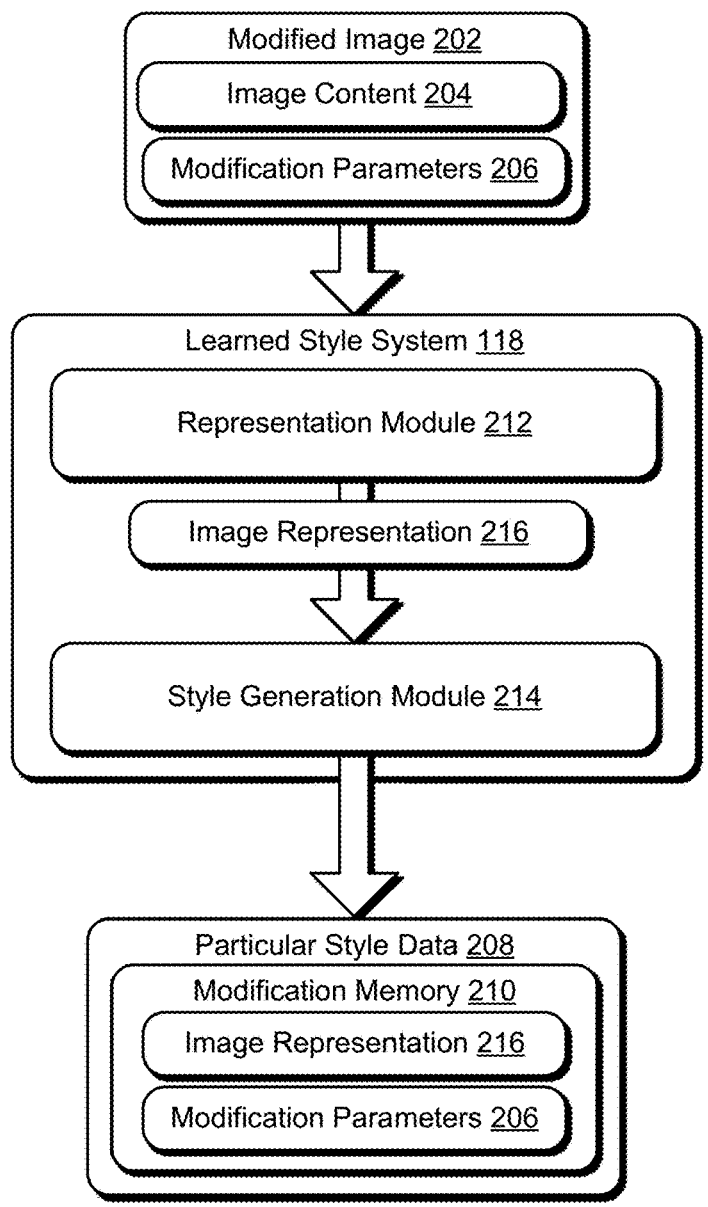
FIG. 2 depicts an example system in which the learned style system of FIG. 1 generates style data from a modified image and that is usable to modify an input image with a style learned from the modified image.

FIG. 2 depicts an example system 200 in which a learned style system of FIG. 1 generates style data from a modified image and that is usable to modify an input image with a style learned from the modified image. The illustrated example 200 includes from FIG. 1 the learned style system 118.

In the illustrated example 200, the learned style system 118 is depicted receiving modified image 202. In accordance with the described techniques, the modified image 202 has been selected, e.g., by a user, to serve as the basis for a "style" of modification. As used herein, a "style" refers to a manner of modifying an image, such as by changing an image's colors (e.g., greyscale, filter of a particular color, etc.), exposure, contrast, highlights, shadows, whites, blacks, vibrance, contrast, clarity, brightness, saturation, and so forth. A "style" may apply specific changes to certain, limited portions of an image as well, such as to a sky but not to other portions of the image, to a person's face but not to other portions of the image, and so forth. Broadly speaking, the learned style system 118 is configured to learn a style of modification from one or more modified digital images selected by a user to serve as a basis for the style. Although a single modified image 202 is depicted, users may select more than one image to serve as the basis for a style. As noted above and below, the described techniques are capable of generating a style from just a single selected image or alternately from multiple selected images.

The modified image 202 includes image content 204 and modification parameters 206. The image content 204 represents information to produce a viewable image from data obtained via a camera's sensor data, such as to produce an image comprising pixels each having a corresponding pixel value to depict a captured scene. In one or more implementations, the modified image 202 is a raw image file. Examples of raw image file types include .raw, .dng, .crw, .orf, and so on. Moreover, the image content 204 corresponds to information describing the captured scene, before modification to the image to form the modified image 202. The image content 204 may thus be considered an "original" image. The modification parameters 206 represent a list of parameters that have been modified by an image editing application, such as responsive to receiving user inputs via a user interface of the application to modify the image content 204.

Although there may be hundreds of parameters in implementation, the modification parameters 206 may correspond to only the parameters modified as a result of modifying the image content 204. Consider an example in which there are just four parameters—exposure, contrast, highlights, and shadows. In this example, assume that user input is received to increase exposure by 32.0 exposure stops, to decrease contrast by 10.0 units, and to increase shadows by 34.0 units, but that no input is received to modify highlights. In this scenario, the modification parameters 206 may be configured as a vector indicative of the modified parameters, such as a vector configured to represent the following values {32.0, −10.0, 34.0}. Alternately, the modification parameters 206 may include values for each modifiable parameter, such that the parameters that are modified due to modifying the image content 204 have non-zero values and the parameters that are not modified have zero values or other values (e.g., null) indicating that the respective parameter is not modified.

With respect to the modification parameters 206, the content editing application 104 provides tools that enable a user of the computing device 102 to modify the image content 204 to create the modified image 202. For instance, the content editing application 104 presents the image content 204 via a user interface of the application for editing. Given the above-discussed parameters—exposure, contrast, highlights, shadows, whites, blacks, vibrance, contrast, clarity, brightness, saturation, and so forth—the content editing application 104 is configured to provide access to tools via the user interface that enable these parameters to be modified, such as to increase the exposure. In one or more implementations, the content editing application 104 displays via the user interface one or more graphical interface components via which a user can provide input to modify a particular parameter, such as a slider bar and/or a text box to modify the particular parameter. Alternately or additionally, the content editing application 104 provides interfaces via which a user can provide input to modify a particular parameter in other ways, such as by receiving spoken commands from a user. The content editing application 104 may enable a user to provide input to modify digital images and, responsive to receiving such modification inputs, create modified digital images having respective modification parameters in a variety of ways without departing from the spirit or scope of the described techniques.

As mentioned above, the learned style system 118 learns a style from modified images selected to serve as a basis for the style. In the illustrated example 200, the modified image 202 serves as a basis for a style. In accordance with the described techniques, the learned style system 118 leverages the image content 204 and the modification parameters 206 of the modified image 202 to generate data that captures the image's style and enables the style to be applied to subsequent images. For each modified image that is selected to serve as a basis for a style, the learned style system 118 generates a "modification memory" for the modified image. Further, the learned style system 118 generates style data for the respective style and inserts the "modification memories" of each of the selected images into the style data. Thus, there is a one-to-one relationship between images selected to serve as a basis for a style and modification memories included in the style data of a respective style. In one or more implementations, the style data may be configured as a file that maintains these modification memories.

Given that the learned style system 118 is depicted obtaining a single image (the modified image 202) to serve as a basis for a style in the illustrated example 200, the learned style system 118 is also depicted producing particular style data 208 having a modification memory 210, i.e., a single modification memory for a single selected image. The particular style data 208 is one example of data that may be included as part of the style data 120. Indeed, the style data 120 may include separate style data for multiple different styles, e.g., for two styles, the style data 120 may include two separate style data files. In scenarios where multiple modified images are selected to serve as a basis for a style, the learned style system 118 produces multiple respective modification memories and inserts them into generated style data for the style.

In the illustrated example 200, the learned style system 118 includes representation module 212 and style generation module 214. Although depicted with these two modules, in implementation the learned style system 118 may include more, fewer, or different modules to generate modification memories of selected modified images and data for persisting these modification memories without departing from the spirit or scope of the techniques described herein.

The representation module 212 represents functionality to generate image representation 216 of the image content 204. Rather than a pixel-by-pixel entirety of the image content 204, the image representation 216 is a reduced, analyzed representation of the image content 204 which generalizes the image content 204 in a manner that captures its relevant features but omits details that may not be relevant for applying style to subsequent images. The image representation 216 can be configured as a vector having one or more components that capture the reduced, analyzed representation. In one or more implementations, the representation module 212 generates the image representation 216 to have two components that are descriptive of the image content 204. By way of example, the first component corresponds to one or more distributions (e.g., histograms) descriptive of the image content 204 and the second component corresponds to a feature vector descriptive of the image content 204.

Specifically, the representation module 212 generates the first component as one or more distributions of luminance and/or chrominance of the image content 204. The representation module 212 is configured to generate these distributions by processing the image content 204 with respect to a given color space (e.g., YCbCr) to determine luminance and chrominance values of the image content 204's pixels, and then by capturing the determined values in the respective distribution. The representation module 212 generates the second component as a feature vector, such as a feature vector having n-dimensions of numerical features that represent higher level semantic characteristics of a scene depicted in the image content 204. To generate the feature vector, the representation module 212 is configured to leverage machine learning, such as by providing the image content 204 to a neural network and extracting the feature vector as output of the neural network.

By way of example, the representation module 212 may provide the image content 204 as input to a deep neural network trained on hundreds or thousands of digital photographs to learn characteristics of the large set of training images. Such a deep neural network may have a convolutional architecture with one or more convolutional layers that reduce the input image content 204 to an underlying representation, e.g., to numerical values for a number (e.g., 1024) of neural nodes of the network. The deep neural network may also include layers to upsample the underlying representation so that an output image has a same number of pixels as the input image content 204.

Although this particular two-component implementation is described, the representation module 212 may generate the image representation 216 in different ways to capture information about the image content 204 without departing from the spirit or scope of the described techniques. By way of an example, the image representation 216 may comprise various combinations of a set of selected predefined information and/or neural network derived information. Examples of the selected predefined information include, but are not limited to mean and standard deviation of image color intensity values across an entirety of the image content 204, values within a set of luminance tonal bins or color bins, and distributions of the luminance tonal bin and color bin values, which represent the frequency of occurrence of the values across the image content 204 or within designated tonal- or color-based bins. Examples of the neural network derived information can be extracted from a neural network trained to perform an image-related task, e.g., recognizing objects within an image or recognize nature of a scene captured within an image. The image representation 216 may also include different or additional information in the spirit or scope of the described techniques.

Given the image representation 216 and the modification parameters 206, the style generation module 214 is configured to generate the modification memory 210 for the modified image 202. The style generation module 214 is also configured to generate the particular style data 208 so that it includes the modification memory 210. In relation to the illustrated example 200, the style generation module 214 packages the image representation 216 and the modification parameters 206 into the modification memory 210. Broadly speaking, the style generation module 214 packages an image representation and modification parameters into a modification memory for each modified image selected as a basis for a style. In relation again to the illustrated example 200 though, the style generation module 214 further packages the modification memory 210 in the particular style data 208. Where multiple images are selected as a basis for a style, the style generation module 214 packages modification memories generated for each of the multiple images in respective style data. In one or more implementations, the style generation module 214 generates the particular style data 208 as a text file, e.g., a JavaScript Object Notation (JSON) file. To contrast style data generated for styles based on selection of a single modified image and style data generated for styles based on selections of multiple modified images, consider the following discussion of FIGS. 3A and 3B.

Figure 3A:
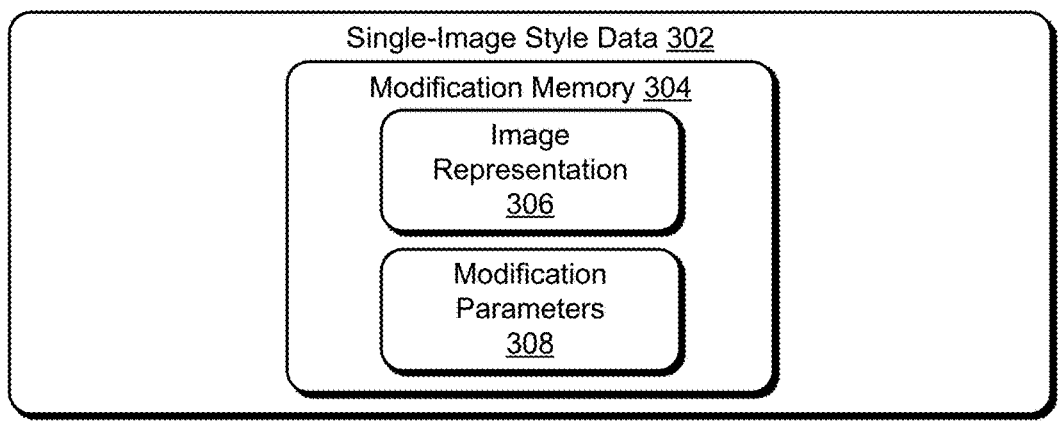
FIGS. 3A and 3B depict example implementations of style data for a first style generated from a single modified image and style data for a second style generated from multiple modified images, respectively.
Figure 3B:
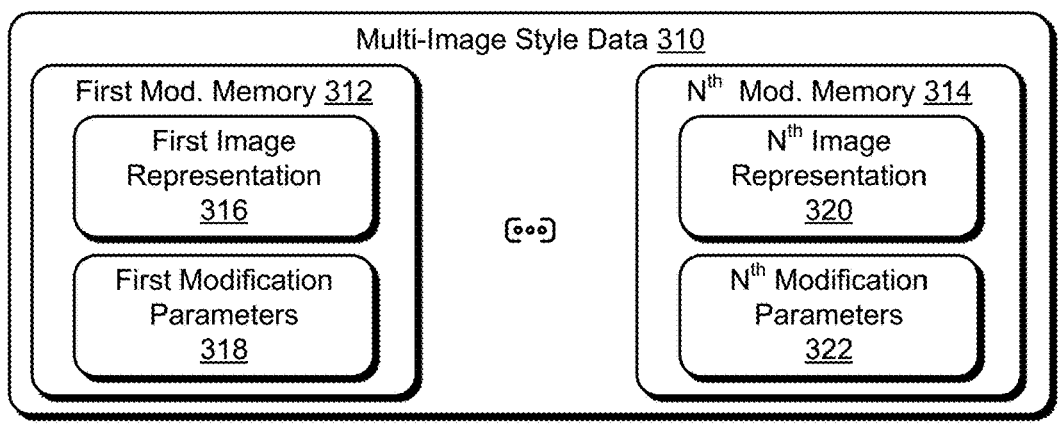

FIGS. 3A and 3B depict at 300 example implementations of style data for a first style generated from a single modified image and style data for a second style generated from multiple modified images, respectively.

In particular, FIG. 3A includes single-image style data 302. Since the single-image style data 302 is generated to capture a style that is based on a single modified image, the single-image style data 302 includes just one modification memory—in the illustrated example modification memory 304. In the context of FIG. 2, the style generation module 214 generates the modification memory 304 by packaging an image representation 306, generated by the representation module 212 of the single modified image, with modification parameters 308 extracted from the single modified image, e.g., from a raw file corresponding to the single modified image. The single-image style data 302 may then be saved in the style data 120 for later use, e.g., to apply the respective style to an input image.

FIG. 3B includes multi-image style data 310. In contrast to the single-image style data 302, the multi-image style data 310 is generated to capture a style that is based on at least two modified images. To this end, the multi-image style data 310 is depicted with two modification memories—first modification memory 312 and $N^{th}$ modification memory 314—and ellipses to indicate that the multi-image style data 310 may include more modification memories than just the two depicted. In accordance with the described techniques, the style generation module 214 generates the first modification memory 312 by packaging first image representation 316, generated by the representation module 212 of a first modified image, with first modification parameters 318 extracted from the first modified image, e.g. from a raw file corresponding to the first modified image.

Further, the style generation module 214 generates the $N^{th}$ modification memory 314 by packaging $N^{th}$ image representation 320, generated by the representation module 212 of an $N^{th}$ modified image (e.g., a second modified image or a third modified image), with $N^{th}$ modification parameters 322 extracted from the $N^{th}$ modified image, e.g. from a raw file corresponding to the $N^{th}$ modified image. Here, "N" represents any number greater than or equal to two. Once generated, the multi-image style data 310 may then be saved in the style data 120 for later use, e.g., to apply the respective style to an input image.

As noted above, the image representation 216 may be configured as a vector, having different components that each represent a particular analysis of the image content 204. In the following discussion and also further below, images may be represented by the term I, representations of the images represented by the term α, and modification parameters represented by the term λ. A particular image may be expressed using a subscript, e.g., '1' to refer to a first image, '2' to refer to a second image, and so forth. The corresponding modification parameters may be expressed using a superscript. In this way, the term $λ^1$ refers to the modification parameters of image $I_1$. It is further to be appreciated that the modification parameters for a particular image may be configured in vector form to capture the parameter values, such that the term $λ^1$ represents a vector of the modification parameters of image $I_1$. Assuming in one example that the modified image 202 corresponds to image $I_1$, the modification memory 210 may be expressed according to the following:

$$(α(I_1), λ^1)$$

Here, the term $α(I_1)$ thus represents the image representation 216 (e.g., in a vectorized format) of the image content 204 and the term $λ^1$ represents the modification parameters 206. Moreover, the style corresponding to the particular style data 208 may be expressed as follows in one example, where the term S represents the style:

$$S=\{(α(I_1), λ^1)\}$$

This expression may thus represent a style that is based on a single modified image—having just a single modification memory—such as the style corresponding to the single-image style data 302. In contrast, a style S that is based on three images, and thus having three modification memories, may be expressed as follows:

$$S=\{(α(I_1), λ^1), (α(I_2), λ^2), (α(I_3), λ^3)\}$$

Here, the terms $I_1$, $I_2$, and $I_3$ correspond to first, second, and third images (e.g., the image content of them) serving as a basis for the style S. It follows then, that the terms $α(I_1)$, $α(I_2)$, and $α(I_3)$ correspond to the image representations of the images $I_1$, $I_2$, and $I_3$, respectively. Further, the terms $λ^1$, $λ^2$, and $λ^3$ correspond to the modification parameters used to modify the images $I_1$, $I_2$, and $I_3$, respectively.

More generally, a style $S_n$ that is based on multiple images may be represented according to the following notation, where n corresponds to the number of images:

$$S_n=\{(α(I_a), λ^a)\}_{a=1 \ldots n}$$

This expression indicates that the style $S_n$ comprises a set of modification memories indexed by the integer a, which has values from 1 to n. In addition to generating styles based on selected images, the learned style system 118 may generate styles by combining already generated styles. By way of example, the learned style system 118 is configured to combine a first style $S_1$ with a second style $S_2$ to create a third, combined style $S_{12}$, such as based on selections of the first and second styles and further based on a selection to create a new style based on the first and second styles. Consider an example in which the first style $S_1$ is based on first, second, and third images and the second style $S_2$ is based on fourth and fifth images. The first, second, third, fourth, and fifth images are represented by the terms $I_1$, $I_2$, $I_3$, $I_4$, and $I_5$, respectively, in the following discussion. In this example, the first style $S_1$ can be represented as follows:

$$S_1=\{(α(I_1), λ^1), (α(I_2), λ^2), (α(I_3), λ^3)\}$$

In this example, the second style $S_2$ can be represented as follows:

$$S_1=\{(α(I_4), λ^4), (α(I_5), λ^5)\}$$

To generate the third, combined style $S_{12}$ the learned style system 118 may create style data that includes modification memories of the first, second, third, fourth, and fifth images, e.g., by combining the style data of the first and second styles. Accordingly, the style data for the combined style $S_{12}$ includes five modification memories. In accordance with the described techniques, the combined style $S_{12}$ may be represented in accordance with the following expression:

$$S_{12}=\{S_1, S_2\}=\{(α(I_1), λ^1), (α(I_2), λ^2), (α(I_3), λ^3), (α(I_4), λ^4), (α(I_5), λ^5)\}$$

Figure 4:
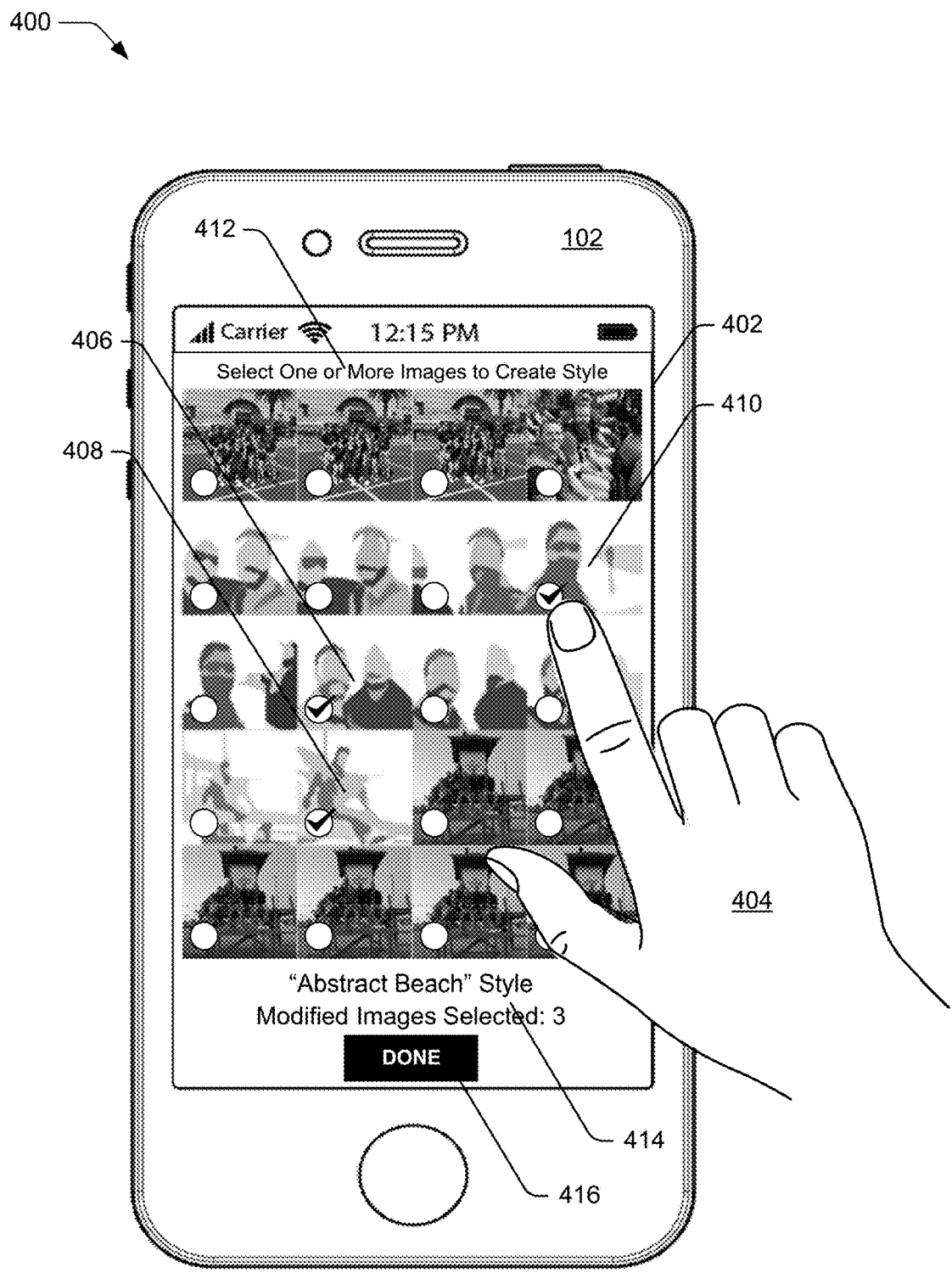
FIG. 4 depicts an example implementation of a user interface via which one or more modified images are selectable to serve as a basis for learning a style of modification.

In the context of selecting one or multiple images to serve as the basis for a style, consider the following discussion of FIG. 4. FIG. 4 depicts an example implementation 400 of a user interface via which one or more modified images are selectable to serve as a basis for learning a style of modification.

In the illustrated example 400, the computing device 102 is depicted displaying user interface 402, which includes displayed representations (e.g., thumbnails) of a plurality of selectable digital images. In this example, a hand of a user 404 is depicted selecting images via the user interface 402 to serve as the basis for a particular style. In particular, the user 404 has selected three images in the illustrated example 400. Selected images 406, 408, 410 are indicated selected in the illustrated example 400 by checkmarks displayed in relation to a respective selection indicator. Unselected images do not include checkmarks displayed in relation to a respective selection indicator. The user interface 402 also includes prompt 412, which prompts the user 404 to select one or more modified images to serve as a basis for a style.

In the illustrated example 400, the user interface 402 also includes style information 414 and a done interface instrumentality 416. Here, the style information 414 includes a name ("Abstract Beach") of the respective style and describes a number of modified images serving as a basis for the style (3 images). The user interface 402 may surface functionality that allows a user to input information, such as a style name. Examples of this functionality include exposure of a text box and a keyboard to type in the text box, use of a voice-based user interface, and so forth. The number of images may be updated automatically by the learned style system 118 as images are selected by the user 404. Certainly the user interface may include different information than depicted and described in relation to the illustrated example without departing from the spirit or scope of the described techniques.

The done interface instrumentality 416 represents functionality to initiate generation of style data based on the selected images. For instance, responsive to receiving user selection of the done interface instrumentality 416 (or some other similarly configured instrumentality), the selected images 406, 408, 410 may be provided by an application (e.g., the content editing application 104 or an operating system of the computing device 102) as input (e.g., in a raw format) to the learned style system 118. Responsive to receiving the selected images 406, 408, 410, the learned style system 118 generates three modification memories— one modification memory for each of the selected images— and packages the modification memories in style data for the respective style (for the "Abstract Beach" style), which may then be maintained as part of the style data 120. Certainly, generation of the style data may be initiated in different ways (e.g., responsive to a voice command) without departing from the spirit or scope of the techniques described herein.

It is to be appreciated that the user interface 402 is just one example of a user interface that may be usable to select images to serve as a basis for a style. Other interfaces, configured in myriad ways, may be surfaced and enable selection of modified images to serve as a basis for a style in the spirit and scope of the described techniques. Rather than simply selecting modified images from a collection of images, for instance, the learned style system 118 can also surface functionality to record modifications as a user makes the modifications to one or more images. Once this recording is stopped, the learned style system 118 can generate modification memories 210 of the images modified during the recording, such that these modification memories are maintained as the style data for a style.

In one or more implementations, the functionality to record modifications is surfaced via a user interface of the content editing application 104. For example, a content editing interface of the content editing application 104 may include a displayed "record" button or be configured to detect a voice command to "record" image modification operations. Responsive to selection of such a button or detection of a record command, the learned style system 118 records user inputs received to modify a digital image presented via the interface, such as user inputs to modify any of the various parameters described above, e.g., exposure, contrast, highlights, shadows, whites, blacks, vibrance, contrast, clarity, brightness, saturation, and so forth. While these inputs are recorded, the content editing interface of the content editing application 104 may include a displayed "stop" button or be configured to detect a voice command to stop recording the image modification operations for the purpose of generating a style from them. Responsive to selection of this button or detection of a stop command, the learned style system 118 may generate a style from the modified image or images, such that the style can be applied to subsequent images as discussed above and below. It is to be appreciated that modifications to images may be recorded in different ways, e.g., according to different sequences of selections to record modifications and stop recording them, and for the purpose of using the modified images to serve as a basis for a style without departing from the spirit or scope of the described techniques. In the context of applying a style to a subsequent image, consider the following discussion of FIG. 5.

Figure 5:
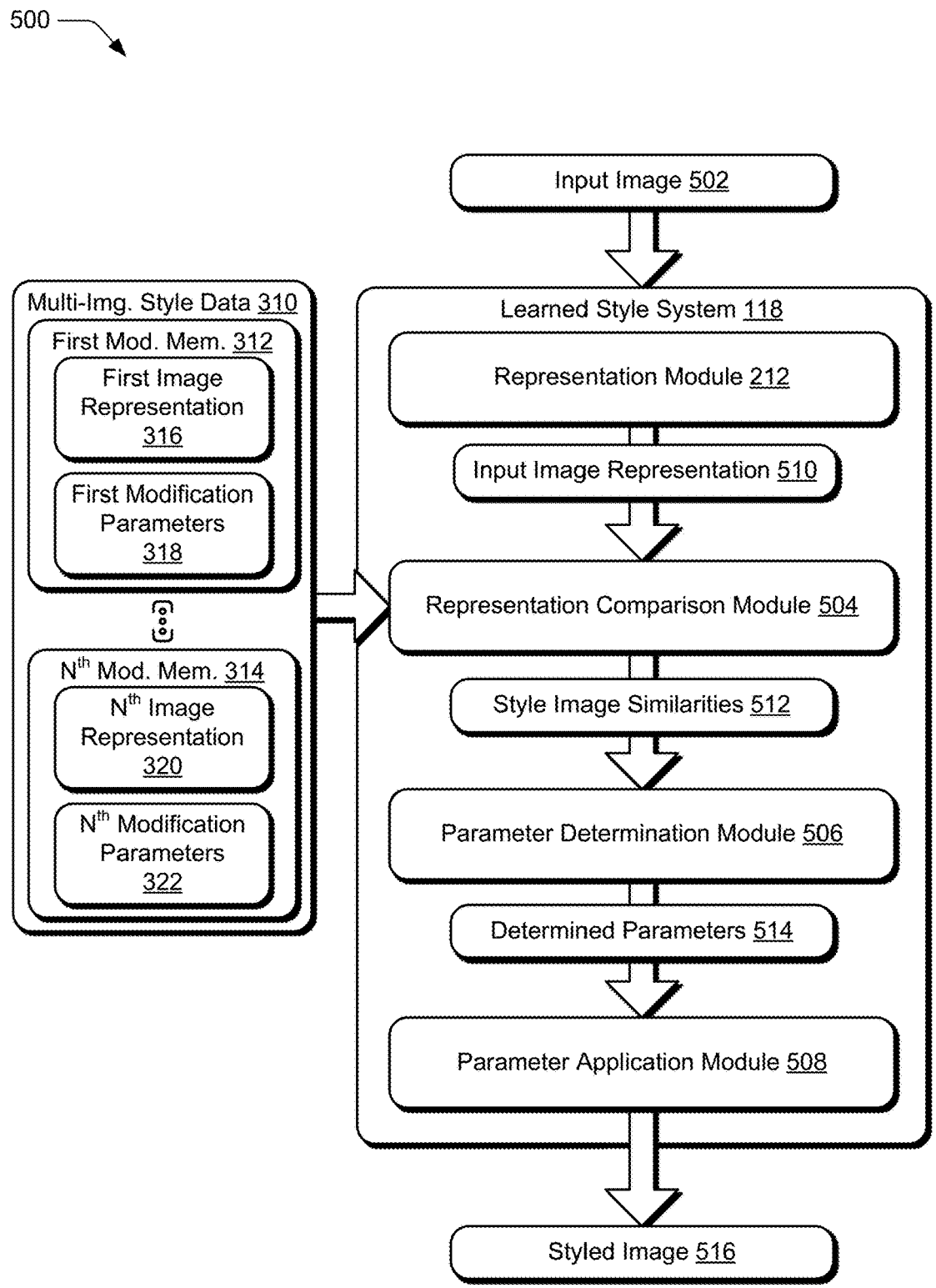
FIG. 5 depicts an example system in which the learned style system of FIG. 1 modifies an input image with a style learned from one or more modified images serving as a basis for the style.

FIG. 5 depicts an example system 500 in which the learned style system of FIG. 1 modifies an input image with a style learned from one or more modified images serving as a basis for the style.

The illustrated example 500 includes the learned style system 118, having the representation module 212 of FIG. 2. The illustrated example 500 also includes from FIG. 3, the multi-image style data 310 in order to explain the functionality of the system 500, however; it is to be appreciated that the system is also capable of applying styles where the corresponding data includes just a single modification memory, such as the single-image style data 302, without departing from the spirit or scope of the described techniques.

In this example 500, the learned style system 118 is depicted obtaining input image 502 and the multi-image style data 310 as input. The learned style system 118 may receive these as input, for instance, responsive to receiving a selection via a user interface of a style corresponding to the multi-image style data 310 and a selection to apply the style to the input image 502. By way of example, user input may be received by the content editing application 104 via a user interface to select the style from one or more already-created styles. Additional user input may then be received by the content editing application 104 via the user interface to apply the selected style to the input image 502. Certainly, input to select an already-created style and input to select to apply a selected style to a particular image may be received in a variety of ways without departing from the spirit or scope of the described techniques, such as via voice commands, keyboard shortcuts, and so forth.

In addition to the representation module 212, the learned style system 118 is depicted with representation comparison module 504, parameter determination module 506, and parameter application module 508. These modules represent functionality to use the modification memories of a selected style to apply a style captured by the modification memories to an input image. Further, these modules generate a styled image from the input image by applying the style in accordance with the following discussion. Although illustrated with these particular modules, the learned style system 118 may include more, fewer, or different modules to apply styles to input images in accordance with the following discussion without departing from the spirit or scope of the described techniques.

Here, the representation module 212 represents functionality to generate input image representation 510 of the input image 502. By way of example, the representation module 212 may generate the input image representation 510 in a similar manner as it generates the image representation 216 from the image content 204 of the modified image 202. Thus, rather than a pixel-by-pixel entirety of the input image 502, the input image representation 510 is a reduced, analyzed representation of the input image 502 which generalizes its depicted content in a manner that captures relevant features but omits details that may not be relevant for applying style to the input image. This also enables the input image representation 510 to be compared to the image representations of the multi-image style data 310's modification memories, e.g., to the first image representation 316 of the first modification memory 312 and to the $N^{th}$ image representation 320 of the $N^{th}$ modification memory 314.

The representation comparison module 504 represents functionality to compare the input image representation 510 to the image representations captured in a selected style's modification memories. In relation to the style corresponding to the multi-image style data 310, for instance, the representation comparison module 504 compares the input image representation 510 to the first image representation 316 of the first modification memory 312 and the $N^{th}$ image representation 320 of the $N^{th}$ modification memory 314.

Based on these comparisons, the representation comparison module 504 generates style image similarities 512. In one or more implementations, the style image similarities 512 are scores or values that describe similarity of the input image representation 510 to the image representations of the selected style. For example, each style image similarity 512 describes a similarity of the input image representation 510 to the image representation of each modification memory included in the selected style. Given the multi-image style data 310, for instance, the style image similarities 512 are generated to include at least a first similarity indicative of how similar the input image representation 510 is to the first image representation 316 and an $N^{th}$ similarity indicative of how similar the input image representation 510 is to the $N^{th}$ image representation 320. These similarities may be considered relative insofar as they indicate whether the input image representation 510 is more similar to the first image representation 316 or more similar the $N^{th}$ image representation 320.

In one or more implementations, the representation comparison module 504 determines similarity between images in accordance with the following discussion. As noted above, the image representations may be configured as vectors, and similarity between a first image $I_1$ and a second image $I_2$ corresponds to a measure of how similar images $I_1$ and $I_2$ are to each other. In one example, the representation comparison module 504 may be configured to compute this measure based on a magnitude of difference between the image-representation vectors, e.g., between $\alpha(I_1)$ and $\alpha(I_2)$. For instance, the representation comparison module 504 may be configured to determine the measure of similarity between images $I_1$ and $I_2$ according to the following:

$$\text{similarity}(I_1, I_2) = e^{-\gamma|\alpha(I_1) - \alpha(I_2)|}$$

Here, the term similarity($I_1$, $I_2$) represents the measure of similarity between the images $I_1$ and $I_2$, the term $\gamma$ represents a constant that controls a tightness of the similarity function, and the use of vertical bars | . . . | represents determination of a magnitude of the expression between the vertical bars. In this particular equation, the expression encapsulated within the vertical bars represents a difference between the image-representation vectors $\alpha(I_1)$ and $\alpha(I_2)$ and the use of the vertical bars signifies that a magnitude of that difference is computed. Thus, the representation comparison module 504 is configured to determine a difference between these image-representation vectors and also a magnitude of the difference. By way of example, the representation comparison module 504 may determine the magnitude of the difference in accordance with the following:

$$|\alpha(I_1) - \alpha(I_2)| = \sqrt{(\alpha(I_1) - \alpha(I_2))^2}$$

Here, the representation comparison module 504 computes a square root of the sum of squares of differences of components of the vectors. In the example where the image representations are formed of two components—a vectorized representation of luminance and/or chrominance distributions and a feature vector describing respective image content—the representation comparison module 504 computes the squared difference between the first component of the first image and the first component of the second image as well as the squared difference between the second component of the first image and the second component of the second image. This square root of the sum of squares of the differences of components of the image-representation vectors thus represents a measure of distance between the two image-representation vectors, and therefore the two images. The magnitude of the difference may correspond to a distance between the images, and in one example be captured in accordance with the following:

$$d(I_1, I_2) = |\alpha(I_1) - \alpha(I_2)|$$

Given this, the function represents a distance function. Indeed, the representation comparison module 504 may use other measures of image-representation vector distance without departing from the spirit or scope of the described techniques. Examples of other distance approaches include the sum of squares of components (often referred to as "Euclidean" distance), sum of magnitudes of the component differences, and so forth. When the representation comparison module 504 computes the measure of similarity in accordance with the discussion above and when the image-representation vectors are very different (e.g., distant), the computed measure of similarity approaches zero. In other words, the closer the similarity measure is to zero the less similar the images are that are being compared. By way of contrast, when the representation comparison module 504 computes the measure of similarity in accordance with the discussion above and when the image-representation vectors are similar (e.g., the distance is small), the computed measure of similarity approaches unity (e.g., '1'). Thus the closer the similarity measure is to one, the more similar the images are that are being compared.

Alternately or additionally, the representation comparison module 504 may compute a measure of similarity based on the particular information encoded by the image-representation vectors, such that the function used to compute the similarity measure can include parameters that are tunable based on the encoded information to change the measure of similarity. In other words, tuning of the parameters is effective to yield different similarity measures for two images after the tuning. The described system may enable these parameters to be tuned via a user interface. In at least one implementation, the measure of similarity, similarity($I_1$, $I_2$), between a first image $I_1$ and a second image $I_2$ may be computed according to the following alternate similarity function:

$$\text{similarity}(I_1, I_2) = \frac{1 + e^{-\gamma}}{1 + e^{-\gamma(1 - (d(I_1, I_2) - D)^{1.3})}}$$

Here, the term D represents a constant that affects how that distance measure is scaled. In one implementation example, the representation comparison module 504 sets D to a value of 1.0. Further, the representation comparison module 504 uses the power 1.3 based on identification that its use yields visually pleasing results in applying style. The representation comparison module 504 may leverage different values for the power without departing from the spirit or scope of the described techniques, such as for different configurations of the image representations.

Based on the ability to determine a measure of similarity between any two images, the representation comparison module 504 is further configured to determine a measure of similarity between an input image (e.g., the input image 502) and a style (e.g., the style corresponding to the multi-image style data 310). To determine the measure of similarity between the input image and the style, the representation comparison module 504 uses the measure(s) of similarity determined between the input image and the style's one or more images. In one example, the representation comparison module 504 determines a measure of similarity between input image I and a style S in accordance with the following:

$$\text{style\_sim}(I, S) = \langle \text{similarity}(I, I_\alpha) \rangle_\alpha$$

Here, style_sim( . . . ) represents a function used to determine a similarity measure between an input image and a style. By way of contrast, similarity( . . . ) represents the function to determine a similarity measure between two images—in the above example those images are the input image I and a given image $I_\alpha$ of the style S. The term a represents an integer index over all the images of the style S, such that similarity is measured between the input image I and each of the images of the style S. In this particular example, the use of the notation $\langle \ldots \rangle_\alpha$ represents a determination of an average of the encapsulated portion of the expression. Thus, in this particular example, the representation comparison module 504 is configured to determine a measure of similarity between the input image I and each of the images of the style S, and then determine an average (e.g., mean) of the determined measures of similarity. The representation comparison module 504 then uses this determined average as the measure of similarity between the input image I and the style S. Although mean is discussed, other averages may be used without departing from the spirit or scope of the described techniques.

By way of example, the representation comparison module 504 may instead identify and use a maximum determined similarity measure between the input image I and the images of the style S. Alternately or additionally, the representation comparison module 504 may compute and use a soft maximum of the determined similarity measures between the input image I and the images of the style S. For instance, the representation comparison module 504 may compute the soft maximum in accordance with the following:

$$\text{style\_sim}_{soft}(I, S) = \frac{\sum_{a=1}^{N} e^{-k \text{ similarity}(I, I_a)} \text{similarity}(I, I_a)}{\sum_{a=1}^{N} e^{-k \text{ similarity}(I, I_a)}}$$

Accordingly, the term $\text{style\_sim}_{soft}(I,S)$ represents a function used to determine a soft maximum of the input image I and the style S. The term k represents a constant that controls specificity of the soft maximum. When the representation comparison module 504 uses relatively larger values for k, the representation comparison module 504 determines a measure that approximates the maximum similarity value over the images of the style S. In contrast, when the representation comparison module 504 uses relatively smaller values for k, the representation comparison module 504 determines a measure that approximates the mean similarity over the images of the style S.

The representation comparison module 504 may use still other measures for measuring similarity between an input image and a style. When the image representations are configured to represent multiple semantically separated components, such as luminance/chrominance distributions and feature vectors, for instance, the representation comparison module 504 may be configured to determine similarity between the different components of the representations. By way of example, the representation comparison module 504 may determine similarity measures between the input image's feature vector and feature vectors of each image of the style. In this scenario, the representation comparison module 504 also determines similarity measures between the input image's luminance/chrominance distributions and luminance/chrominance distributions of each image of the style.

In the following discussion, the information described by the feature vector may be generalized as "form" and the information described by the luminance/chrominance distributions may be generalized as "tone." To this end, the representation comparison module 504 may be configured to compute a measure of similarity between images in terms of their form, such as according to the following in one example:

$$\text{similarity}_{form}(I_1,I_2) = e^{-\gamma_{form}|\alpha_{form}(I_1) - \alpha_{form}(I_2)|}$$

Likewise, the representation comparison module 504 may be configured to compute a measure of similarity between images in terms of their tone, such as according to the following in one example:

$$\text{similarity}_{tone}(I_1,I_2) = e^{-\gamma_{tone}|\alpha_{tone}(I_1) - \alpha_{tone}(I_2)|}$$

Given the similarities in form and tone, the representation comparison module 504 may be configured to compute similarity as a function of both form and tone, such as according to the following in one example:

$$\text{similarity}_{form+tone}(I_1,I_2) = \text{fuzzy\_logic}(\text{similarity}_{form}(I_1,I_2), \text{similarity}_{tone}(I_1,I_2))$$

Here, the fuzzy logic representation may represent various logical rules, implemented through simple arithmetic operations on the two similarity measures, e.g., the form similarity measure and the tone similarity measure. For example, the fuzzy logic function can implement the logical 'and' operation, which requires both the tone and form similarity measures to be similar to determine that the two images being compared are similar overall. Alternately or additionally, the fuzzy logic function can implement the logical 'or' operation, which requires that at least one of the tone or form similarity measures be similar to determine that the two images being compared are similar overall. The representation comparison module 504 may be configured to compute similarity on a component-by-component basis in various ways without departing from the spirit or scope of the described techniques.

Once the style image similarities 512 are determined, the parameter determination module 506 determines parameters for modifying the input image 502 based on the style image similarities 512. In the illustrated example 500, determined parameters 514 represent the parameters that are determined for modifying the input image and that are determined based on the style image similarities 512. Broadly speaking, the parameter determination module 506 determines the determined parameters 514 so that they are similar to the modification parameters of a style's images to which the input image 502 is similar. Conversely, the determined parameters 514 are less similar to the modification parameters of the images to which the input image 502 is less similar. In other words, the parameter determination module 506 may generate the determined parameters 514 by weighting the modification parameters of the applied style's modification memories, e.g., based on similarity of the input image to the respective images of the applied style's modification memories.

In at least one implementation, the parameter determination module 506 determines the determined parameters 514 in accordance with the following discussion. In this scenario, the parameter determination module 506 generates a prediction of the parameters to apply to the input image 502 such that the predictions capture a gist of the style as described by its modification memories. Given an image I (e.g., the input image 502) and a style S (e.g., a style corresponding to the multi-image style data 310), for instance, the parameter determination module 506 predicts the determined parameters 514 λ as a function of the image I and the style S, which is represented as λ(I,S). By way of example, the parameter determination module 506 predicts the determined parameters 514 in at least one implementation as a blend among multiple "modification memory shells" in accordance with the following:

$$\lambda(I, S) = P_1(I)\lambda_{shell\ 1}(I) + (1 - P_1(I))$$
$$(P_2(I)\lambda_{shell\ 2}(I) + (1 - P_2(I))(P_3(I)\lambda_{shell\ 3}(I) + (1 - P_3(I))\lambda_{outside}))$$

In this parameter blending equation, the terms $P_1$, $P_2$, and $P_3$ represent blending probabilities that measure the influence of each of a first shell, a second shell, and a third shell for weighting the contributions to the determined parameters 514. The values of P range between 0 and 1, where values closer to 1 indicate that the image representations of a respective shell are "close" to the input image representation 510, which may be measured as described below, and also that the closeness is statistically significant, which may be measured as described below. The term $\lambda_{outside}$ represents a set of values to assign to the determined parameters 514 when it is determined that the input image 502 is not similar to any of the images in the style being applied, i.e., when the parameter determination module 506 determines that there is a low probability that the representation of the image I is significantly close to images in any of the shells.

The parameter determination module 506 may use different sets of values for the parameters $\lambda_{outside}$. Further, the parameter determination module 506 sets the determined parameters 514 to one such different set of values when the input image 502 is not similar to the images of the style being applied. For example, the set of values may correspond to all zeroes, which does not result in any modifications being made to the parameters of the input image 502. Alternately, the set of values may be based on "auto" adjustment functionality of the content editing application 104. In this scenario, auto adjustment functionality may be leveraged to modify the input image 502. The modifications to the input image 502 resulting from the auto-adjusting are captured by the respective parameters, such that these parameters' values correspond to the set of values. The values of these auto-adjustment parameters may be learned using machine learning, where a machine learning model is trained over thousands of training images to automatically adjust parameters of images to produce visually pleasing images.

Alternately, the set of values may correspond to averages of the modification parameters of the style being applied. For instance, the determined parameter 514 for exposure may be determined as an average of the exposure modification parameters across each modification memory of the style being applied. The parameter determination module 506 may use still other sets of values when the input image 502 is determined too dissimilar to any images of the style, such as simply using the modification parameters of one modification memory of the style, e.g., the modification memory having the most similar image representations. The parameter determination module 506 may also use different sets of values without departing from the spirit or scope of the described techniques. Regardless of which different sets of values are considered, the parameter determination module 506 may cause a user interface component to be displayed that allows a user to select which of the different sets to apply when the image is too different from the images of the style, such as to select between not modifying the image, applying auto adjustment parameters, or applying parameters that are an average of the style's parameters.

Returning to the discussion of the multiple shells, the above-noted equation represents the use of three different shells for determining how much influence the modification parameters of different modification memories will have on the determined parameters 514. It is to be appreciated that the parameter determination module 506 may use different numbers of shells for determining how much influence the modification parameters of the different modification memories have. In one implementation, for instance, the parameter determination module 506 may determine the influence using six shells, and thus determine six probabilities that the images in those shells are significantly close to the input image 502. In general, the above-noted equation is configured to ensure that the parameter determination module 506 gives the most influence to the parameters that are paired with the most similar image representations to the input image representation 510. In this way, the determined parameters 514 are influenced more by the modification parameters that are paired with the most similar image representations than by the modification parameters that are paired with the less similar image representations.

By way of example, if the parameter determination module 506 determines that there is a significantly close image representation in the first shell, then the probability $P_1$ that the image I is assigned the modification parameters of the images in shell 1 is close to one. In this scenario, the parameter determination module 506 determines the determined parameters 514 such that they are heavily influenced by the first shell's parameters $\lambda_{shell\ 1}$. In other words, the determined parameters 514 are derived from the first shell's parameters $\lambda_{shell\ 1}$, such that an amount the first shell's parameters $\lambda_{shell\ 1}$ affect the determined parameters 514 is a function of similarity with the first shell's image representations. The determined parameters 514 are affected by the parameters of the other shells in a similar manner. In general, the term $\lambda_{shell\ 1}$ represents a weighted average of modification parameters over the modification memories within the first shell biased toward closer modification memories, e.g., modification memories having more similar image representations. In scenarios where there is only one modification memory in a shell, then the parameter determination module 506 simply uses the modification parameters of that one modification memory in the parameter blending equation above.

In scenarios where the parameter determination module 506 determines that there are no significantly similar image representations in the first shell though, then the parameter determination module 506 considers the next shell, e.g., the second shell. In this scenario, the value of $P_1$ is close to zero (or zero). By multiplying the first shell's parameters $\lambda_{shell\ 1}$ by a value close to zero, in accordance with the blending equation, the parameter determination module 506 assigns a proportional amount of weight (zero or nearly zero) to the first shell's parameters. In this way, use of the above-noted blending equation allows the parameter determination module 506 to progress to a next shell in a smooth, continuous manner. In a similar manner as discussed in relation to the first shell, if the parameter determination module 506 determines that there is a significantly similar image representation in the second shell, then the probability $P_2$ that the image I is assigned the modification parameters of the images in shell 2 is close to one, and so the second shell's parameters $\lambda_{shell\ 2}$ have a proportional effect on the determined parameters 514.

In one or more implementations, the parameter determination module 506 computes the shell blending probabilities in accordance with the following:

$$P_s(I) = \text{closeness}_s(I) \times \text{significance}(\lambda_s, \sigma_s)$$

Here, the term s represents an index to the various shells, e.g., '1' corresponds to the first shell and ranges from one to the number of shells. The term $\lambda_s$ represents a prediction of the parameters for a given shell s and the term $\sigma_s$ represents a standard deviation, which measures how uniform or non-uniform and noisy the modification parameters are across the modification memories included in the given shell.

In general, the closeness measure, $\text{closeness}_s(I)$, indicates a likelihood that the image I (e.g., its representation) is close to one of the images (e.g., their representations) included in the given shell s. This is the logical compliment of the likelihood that the input image representation 510 is not close to any image in the shell. In one or more implementations, the parameter determination module 506 computes the closeness of the image I to the images included in a given shell s in accordance with the following:

$$closeness_s(I) = 1 - \Pi_{s' \text{ in shell } s}[1 - \text{Similarity}(I, I_{s'})]$$

It is to be appreciated that in various scenarios, the parameter determination module 506 may determine that the image I (e.g., the input image 502) is close to multiple images in a given shell s based on the closeness measure. However, this measure alone may not account for scenarios where the parameters of the multiple images in the given shell are noisy, e.g., are outside of one or more standard deviations. In such scenarios, there may be no clear stylistic trend. Accordingly, the parameter determination module 506 is configured to discount such noisy parameters.

In particular, the parameter determination module 506 is configured to discount noisy modification parameters of a given shell s, by determining the significance measure, significance($\lambda_s, \sigma_s$). In one or more implementations, the parameter determination module 506 determines the significance measure by determining mean values of the modification parameters across the modification memories in the given shell s and standard deviations of those values. The parameter determination module 506 determines the significance measure on a parameter-by-parameter basis, for instance, such that a mean value for an exposure parameter is determined across the modification memories in the given shell s and a standard deviation of the exposure parameter is also determined. To this end, the significance measure indicates how significant the parameter is relative to the "noise" in the parameter as measured by its standard deviation or variance—the less variance there is in a parameter across the modification memories of a given shell the more significant the parameter. In one or more implementations, the parameter determination module 506 determines a significance measure of an individual parameter according to the following:

$$\text{significance}(\text{mean}, \text{noise}) = 1 - e^{-0.693|\text{mean}|/\text{noise}}$$

Here, this function reduces to unity when the mean of the individual parameter is much larger than the noise, approaches zero when the noise dominates the values of the parameter across the shell, and has a value around 0.5 when the mean and noise have equal magnitudes.

As noted above, the parameter determination module 506 is also configured to compute a set of modification parameters for each individual shell, e.g., a first set of modification parameters for the first shell, a second set of modification parameters for the second shell, and so forth. In one example, the parameter determination module 506 computes the set of modification parameters for a given shell in accordance with the following:

$$\lambda_{shell}(I) = \sum_{a \text{ in shell}} \frac{\text{similarity}(I, I_a)^{2.2} \lambda^a}{\sum_a \text{similarity}(I, I_a)^{2.2}}$$

Here, the term a represents an index of the images included in the given shell s, a only indexes the images included in the shell s under consideration. Broadly speaking, these modification parameters computed for each shell correspond to averages of all the modification parameters of the modification memories in the given shell s as weighted by a power of the similarity measures between the image I (e.g., its representation) and the images (e.g., their respective representations) of the modification memories in the given shell s.

Once the parameter determination module 506 determines the determined parameters 514, the parameter application module 508 generates styled image 516 by applying the determined parameters 514 to the input image 502. In other words, the parameter application module 508 modifies the input image 502 in accordance with the determined parameters 514 to produce the styled image 516. The styled image 516 can then be saved in storage, communicated, and displayed. The styled image 516 may also be further modified in a variety of ways, e.g., using tools of the content editing application 104.

Figure 6:
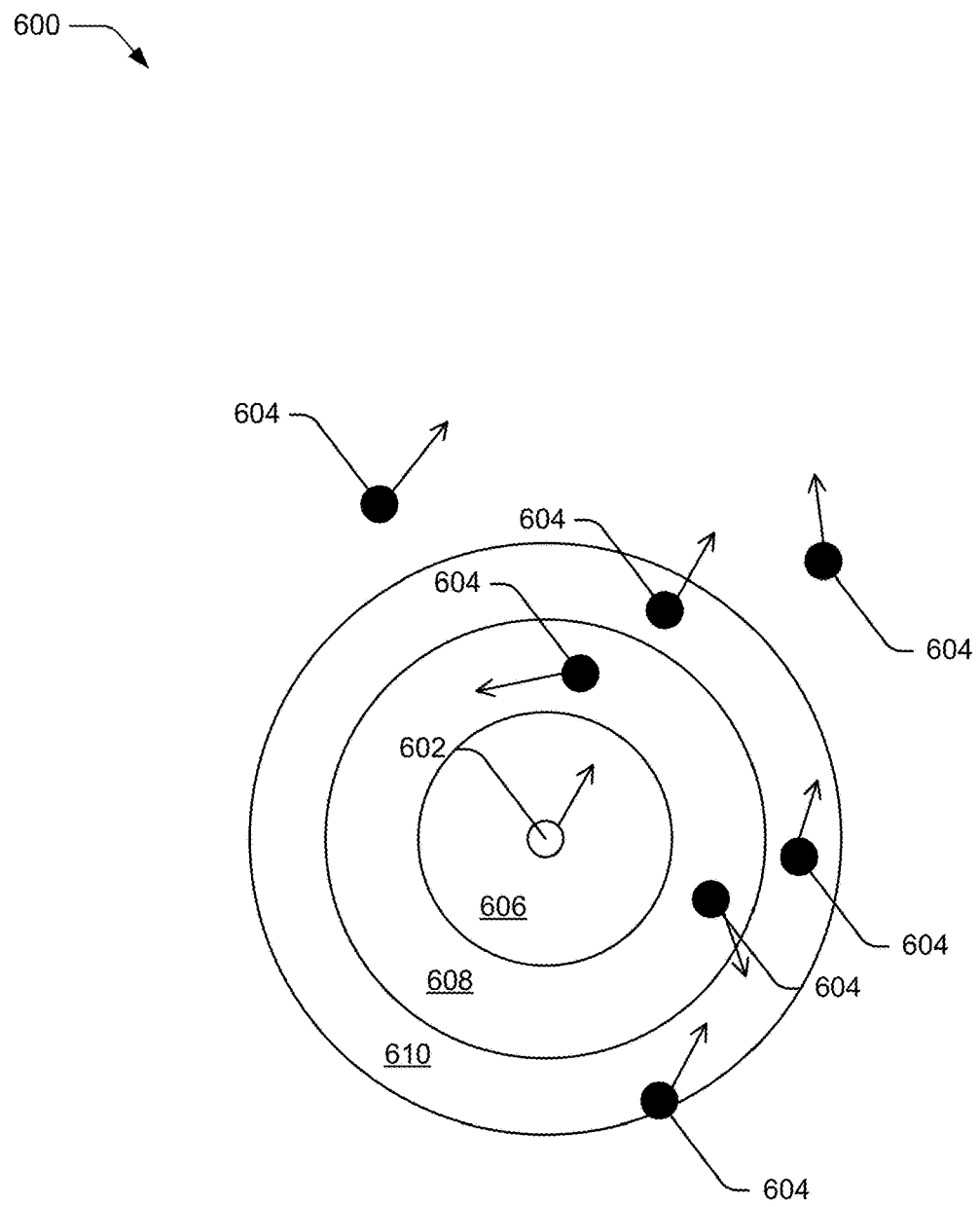
FIG. 6 depicts an example implementation in which an input image is analyzed in relation to images included in generated style data of a style.

FIG. 6 depicts an example 600 of an implementation in which an input image is analyzed in relation to images included in generated style data of a style.

In particular, the illustrated example 600 is a visualization of the shell-based approach described above. This example 600 includes input image 602 and a style's images 604. The input image 602 is positioned at a center of a first shell 606, second shell 608, and third shell 610. The style's images 604 are distributed across these shells and in some cases outside of them, where the distribution is based on the computed closeness and significance of the style's images 604 to the input image 602. Here, the depicted arrows represent the vectors that capture the modification parameters associated with the style's images 604. As noted above, the described systems may use different numbers of shells without departing from the spirit or scope of the described techniques.

Having discussed example details of the techniques for image modification styles learned from a limited set of modified images, consider now some example procedures to illustrate additional aspects of the techniques.

Example Procedures

This section describes example procedures for image modification styles learned from a limited set of modified images in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 of FIG. 1 or the systems 200 of FIG. 2 or 500 of FIG. 5 capable of leveraging the learned style system 118.

Figure 7:
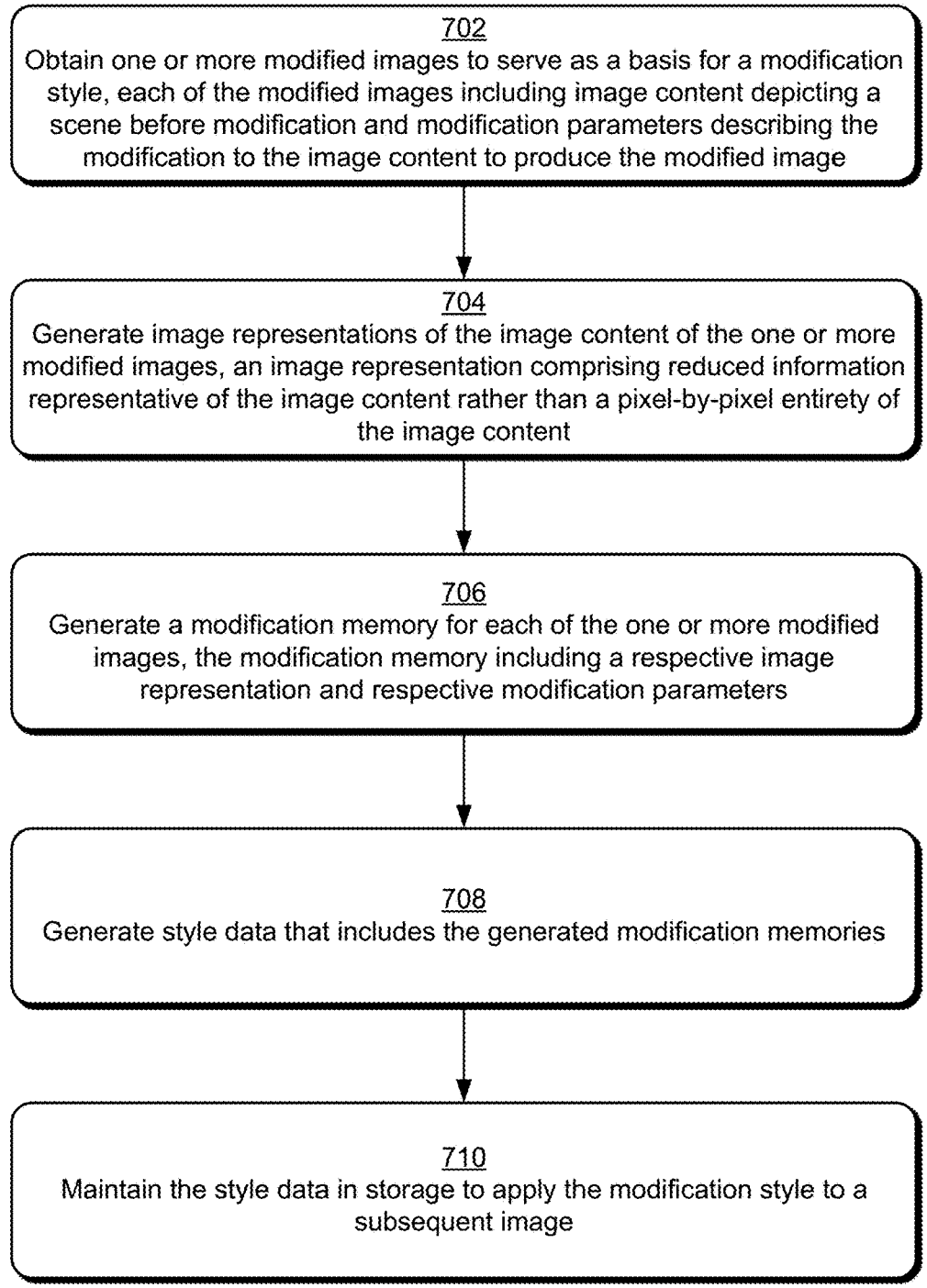
FIG. 7 depicts a procedure in an example implementation in which style data is generated from one or more modified images.

FIG. 7 depicts an example procedure 700 in which style data is generated from one or more modified images.

One or more modified images are obtained to serve as a basis for a modification style (block 702). In accordance with the principles discussed herein, each of the modified images includes image content depicting a scene before modification and also includes modification parameters describing the modification to the image content to produce the modified image. By way of example, the learned style system 118 obtains the modified image 202. For instance, the learned style system 118 obtains the modified image 202 responsive to its selection by the user 404 via the user interface 402.

Image representations of the image content of the one or more modified images are generated (block 704). In accordance with the principles discussed herein, an image representation comprises reduced information representative of the image content rather than a pixel-by-pixel entirety of the image content. By way of example, the representation module 212 generates the image representation 216 of the image content 204 of the modified image 202. The image representation 216 is configured as a reduced representation of the image content 204 as described in more detail above, e.g., as vectors representing luminance/chrominance distribution of the image content 204 and a feature vector generated from the image content 204. In scenarios where multiple images are obtained, the representation module 212 generates multiple image representations, one such representation for each of the obtained images.

A modification memory is generated for each of the one or more modified images (block 706). In accordance with the principles discussed herein, the modification memory generated for a given modified image includes a respective image representation generated from the modified image's image content and also includes respective modification parameters extracted from the modified image. By way of example, the style generation module 214 generates the modification memory 210 for the modified image 202, where the modification memory 210 includes the image representation 216 and the modification parameters 206 extracted from the modified image 202. In scenarios where multiple images are obtained, the style generation module 214 generates modification memories, one such modification memory of each of the obtained images.

Style data is generated that includes the generated modification memories (block 708). By way of example, the style generation module 214 generates the particular style data 208 to include the modification memories generated at block 706, e.g., the modification memory 210 in the illustrated example 200. The style data is maintained in storage to apply the modification style to a subsequent image (block 710). By way of example, the computing device 102 maintains the particular style data 208 as part of the style data 120. Alternately or additionally, the particular style data 208 may be maintained over the network 110 at a different computing device, such as by a computing device of a service provider.

Figure 8:
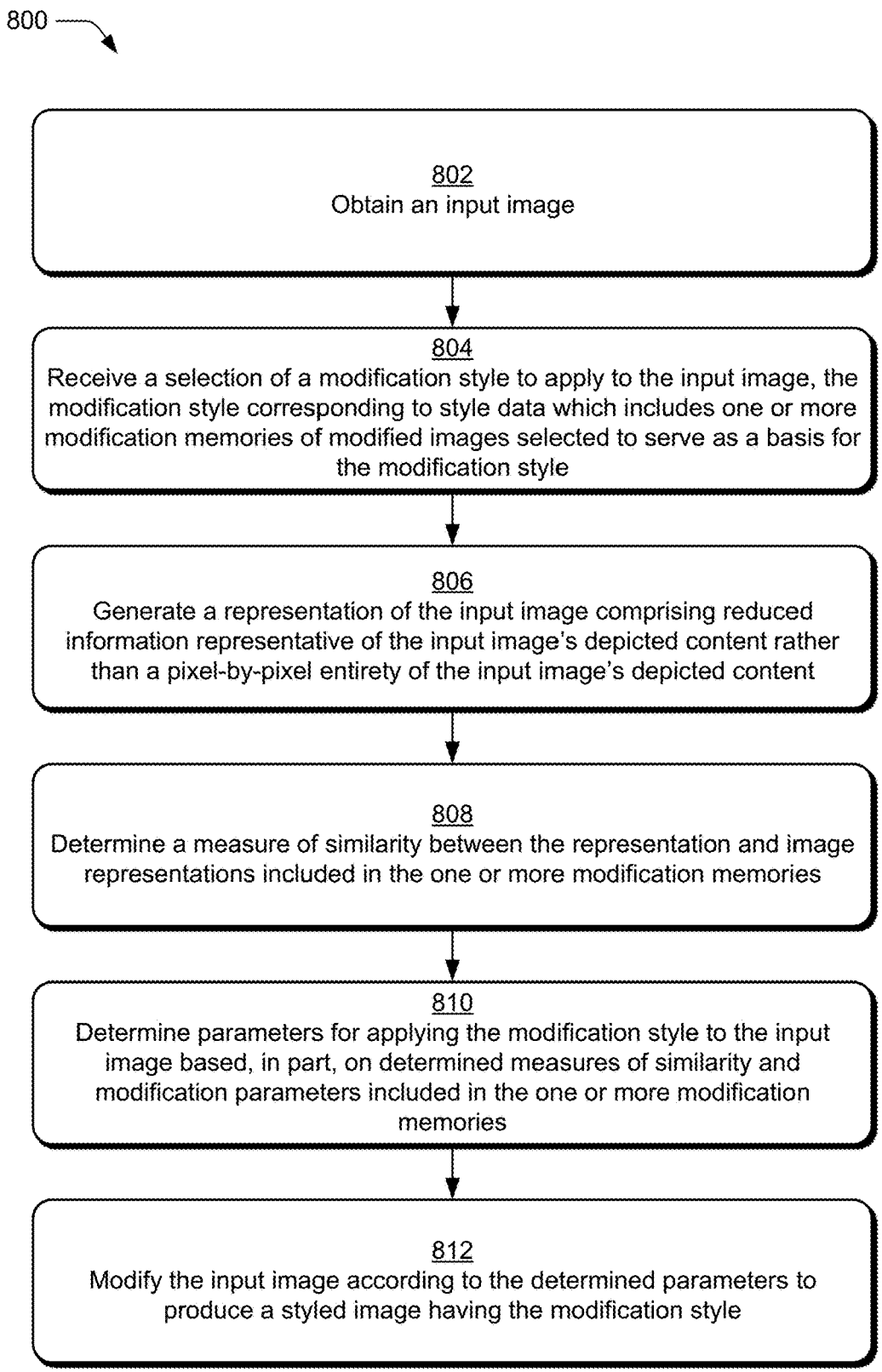
FIG. 8 depicts a procedure in an example implementation in which an input image is modified with a style learned from one or more modified images serving as basis for the style.

FIG. 8 depicts an example procedure 800 in which an input image is modified with a style learned from one or more modified images serving as basis for the style.

An input image is obtained (block 802). By way of example, the learned style system 118 receives a selection of the input image 502 and obtains the input image 502, e.g., from storage local to the learned style system 118 or from remote storage.

A selection of a modification style is received to apply the modification style to the input image (block 804). In accordance with the principles discussed herein, the modification style corresponds to style data, which includes one or more modification memories of modified images that have been selected to serve as a basis for the modification style. By way of example, the learned style system 118 receives a selection of a style corresponding to the multi-image style data 310 via a user interface of the content editing application 104.

A representation of the input image is generated (block 806). In accordance with the principles discussed herein, the representation comprises reduced information representative of the input image's depicted content rather than a pixel-by-pixel entirety of the input image's depicted content. By way of example, the representation module 212 generates the input image representation 510 of the input image 502's depicted content. The input image representation 510 is configured as a reduced representation of the input image 502's depicted content as described in more detail above, e.g., as vectors representing luminance/chrominance distribution of the input image 502's depicted content and a feature vector generated from the input image 502's depicted content.

A measure of similarity is determined between the representation of the input image and image representations included in the one or more modification memories (block 808). By way of example, the representation comparison module 504 determines the style image similarities 512, which in the context of the illustrated example 500 include a measure of similarity between the input image 502 and each image representation of the multi-image style data 310, e.g., the first image representation 316, the $N^{th}$ image representation 320, and representations of any other modification memories of the multi-image style data 310.

Parameters are determined for applying the modification style to the input image based, in part, on determined measures of similarity and modification parameters included in the one or more modification memories (block 810). By way of example, the parameter determination module 506 determines the determined parameters 514 based, in part, on the style image similarities 512 and, in the context of the illustrated example 500, also on the modification parameters captured in the modification memories of the multi-image style data 310, e.g., the first modification parameters 318, the $N^{th}$ modification parameters 322, and parameters of any other modification memories of the multi-image style data 310.

The input image is modified according to the determined parameters to produce a styled image having the modification style (block 812). By way of example, the parameter application module 508 modifies the input image 502 according to the determined parameters 514 to produce the styled image 516.

Having described example procedures in accordance with one or more implementations, consider now an example system and device that can be utilized to implement the various techniques described herein.

Example System and Device

Figure 9:
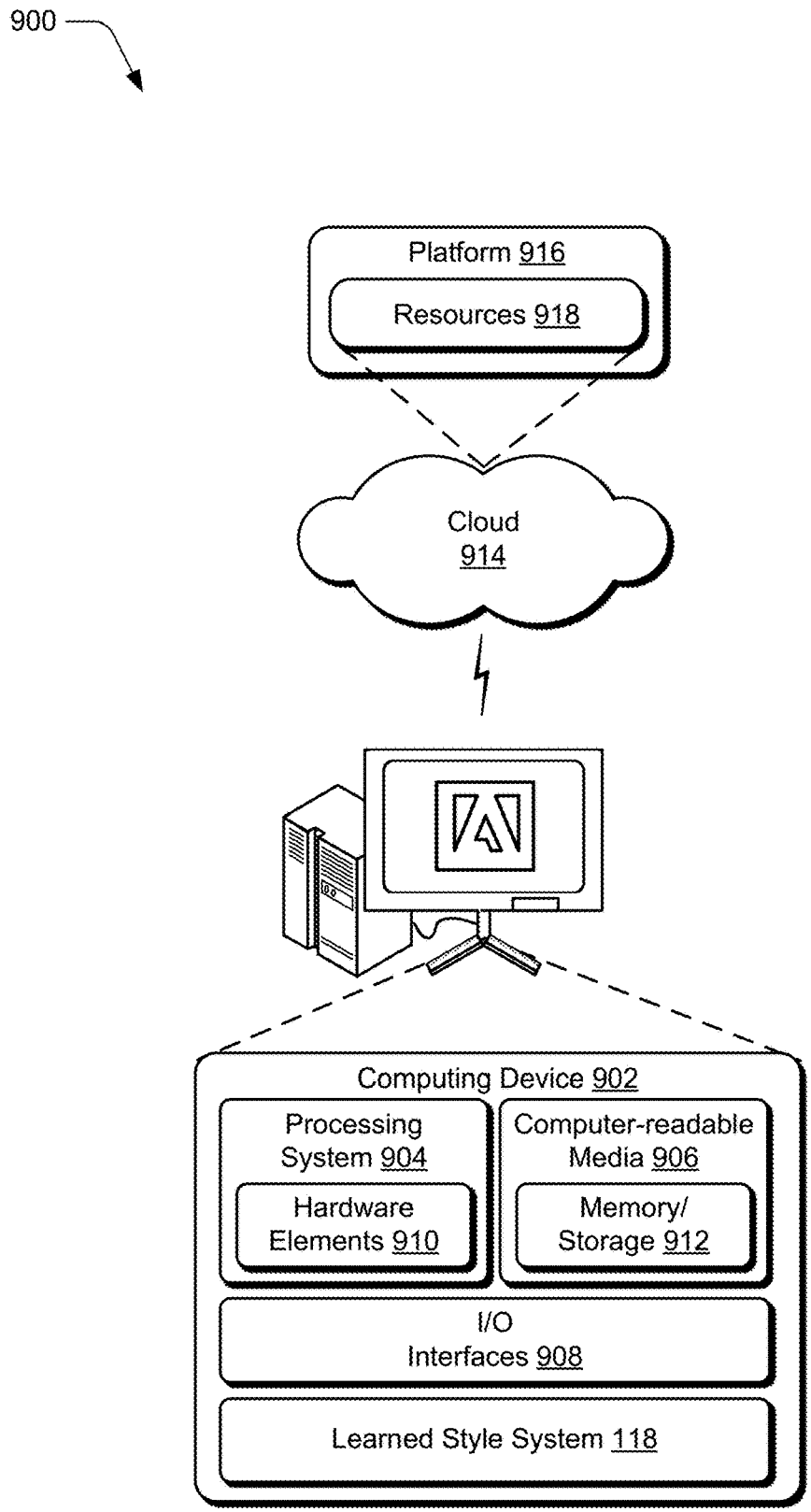
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the learned style system 118. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the subject matter has been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. In a digital medium environment, a method implemented by at least one computing device for applying modification styles of modified images, having been previously modified, to other images, the method comprising:
   obtaining, by the at least one computing device, one or more modified images serving as a basis for a modification style, each of the modified images including image content and modification parameters describing modification to the image content to produce the modified image;
   generating, by the at least one computing device, an image representation of the image content of each modified image;
   generating, by the at least one computing device, modification memories of the modified images, a modification memory including the image representation and the modification parameters of a respective modified image;
   generating, by the at least one computing device, style data for the modification style that includes the modification memories;
   determining modification parameter values for a subsequent image from the modification style by:
      arranging the modification memories into a plurality of shells;
      for each shell of the plurality of shells, determining a shell blending probability for each modification parameter of the modification memories arranged in the shell by:
         determining a closeness measure for the shell, the closeness measure being based on measures of similarity between an image representation of the subsequent image and the image representations of the modification memories arranged in the shell;
         determining a significance measure of the modification parameter, the significance measure being based on an average and a standard deviation of values of the modification parameter; and
         determining the shell blending probability for the modification parameter as a function of the closeness measure for the shell and the significance measure of the modification parameter; and
      determining the modification parameter values based on determined shell blending probabilities across the plurality of shells; and
   applying, by the at least one computing device, the modification style to the subsequent image using the modification parameter values.

2. A method as described in claim 1, wherein the modification memories are generated as vectors and the style data for the modification style is generated as a representation of the modification memories configured for storage in a file structure.

3. A method as described in claim 1, wherein each of the modification parameter values describes a modification to a value of a parameter that is indicative of at least one visual characteristic of image content of the respective modified image, the parameter corresponding to at least one of:
   exposure;
   contrast;
   highlights;
   shadows;
   whites;
   blacks;
   vibrance;
   contrast;
   clarity;
   brightness; or
   saturation.

4. A method as described in claim 1, wherein the image representation of the image content of the respective modified image includes at least two components representative of the image content, the components including:
   a feature vector having dimensions of numerical features that represent semantic characteristics of a scene depicted in the image content; and
   a distribution of tonal values across the image content.

5. A method as described in claim 4, wherein the distribution of the tonal values across the image content captures a distribution of luminance and chrominance components of the image content.

6. A method as described in claim 1, wherein the image content depicts a scene before the modification to the image content to produce the modified image.

7. A method as described in claim 1, wherein the modified images are formatted according to a raw image format.

8. A method as described in claim 1, further comprising:
   maintaining the style data for the modification style in storage; and
   responsive to receiving a user selection to apply the modification style to the subsequent image at a subsequent time, obtaining the style data for the modification style from the storage, wherein the style data includes the modification memories to be arranged into the plurality of shells.

9. A method as described in claim 1, wherein the image representation is generated by providing the image content to a neural network and extracting a feature vector as output of the neural network.

10. A method as described in claim 1, wherein the modification memories are stored as text-based files.

11. A method as described in claim 1, wherein the image representation is generated as reduced information that is representative of original depicted content of a modified image before modification, rather than a pixel-by-pixel entirety of the original depicted content.

12. A system comprising:
   a representation module implemented at least partially in hardware of at least one computing device to generate an image representation of an image's original depicted content taken from a raw image format;

a style generation module implemented at least partially in the hardware of the at least one computing device to generate style data for modified images serving as a basis for a modification style, the style data including image representations of the modified images and modification parameters describing modifications to original depicted content of the modified images used to produce the modified images;

a parameter determination module implemented at least partially in the hardware of the at least one computing device to determine a set of modification parameter values to apply to an input image by:
arranging the modified images of the modification style into a plurality of shells;
determining a shell blending probability for each modification parameter of the modified images arranged in a shell based, at least in part, on a variance of values of the modification parameter across the modified images arranged in the shell; and
determining the set of modification parameter values as a function of shell blending probabilities of the modification parameters across the plurality of shells; and a parameter application module implemented at least partially in the hardware of the at least one computing device to apply the modification style to the input image by modifying the input image using the set of modification parameter values.

13. A system as described in claim 12, wherein the parameter application module is further configured to produce a styled image by outputting the input image as modified using the set of modification parameter values.

14. A system as described in claim 12, wherein the set of modification parameter values is further determined as a function of a weighted average of the values of each modification parameter across the modified images arranged in each shell.

15. In a digital medium environment, a method implemented by at least one computing device for applying modification styles of modified images to other images, the method comprising:
receiving, by the at least one computing device, a first selection of an input image and a second selection of a modification style to apply to the input image, the modification style corresponding to style data which includes one or more modification memories of one or more modified images serving as a basis for the modification style, each modification memory including an image representation and modification parameters of a respective modified image;
generating, by the at least one computing device, an image representation of the input image;
arranging, by the at least one computing device, the one or more modification memories of the modification style into a plurality of shells;
determining, by the at least one computing device, weights of the modification parameters of the one or more modification memories arranged in each shell by:
determining a significance measure for each modification parameter of the one or more modification memories arranged in a shell, the significance measure being based on an average and a standard deviation of values of the modification parameter of the one or more modification memories arranged in the shell; and
determining the weights of the modification parameters of the one or more modification memories arranged in the shell as a function of the significance measure;
determining, by the at least one computing device, modification parameter values for applying the modification style to the input image based on the weights of the modification parameters across the plurality of shells; and
producing, by the at least one computing device, a styled image having the modification style by modifying the input image according to the modification parameter values.

16. A method as described in claim 15, wherein:
the modification parameter represents a modification to a visual characteristic of the respective modified image; and
a value of the modification parameter indicates how much modification to the visual characteristic was applied to the respective modified image.

17. A method as described in claim 15, wherein the image representation of the input image includes at least two components representative of content of the input image, the at least two components including:
a feature vector having dimensions of numerical features that represent semantic characteristics of a scene depicted in the content of the input image; and
a distribution of luminance and chrominance values across the content of the input image.

18. A method as described in claim 15, wherein each modification parameter value of the modification parameter values is further based on a weighted average value of the modification parameter of a corresponding shell.

19. A method as described in claim 15, wherein the significance measure indicates how uniform the values of the modification parameter are across the one or more modification memories arranged in the shell.

20. A method as described in claim 15, wherein the significance measure indicates how much noise is in the values of the modification parameter across the one or more modification memories arranged in the shell.

* * * * *